(12) United States Patent
Rusch

(10) Patent No.: US 6,409,915 B1
(45) Date of Patent: Jun. 25, 2002

(54) RAKE CLEANING ARRANGEMENT

(75) Inventor: Karl Heinz Rusch, Dornbirn (AT)

(73) Assignee: Hans Kuenz Gesellschaft m.b.H., Hard (AT)

( * ) Notice: Subject to any disclaimer, the term of this patent is extended or adjusted under 35 U.S.C. 154(b) by 0 days.

(21) Appl. No.: 09/844,614

(22) Filed: Apr. 27, 2001

(30) Foreign Application Priority Data

Apr. 28, 2000 (AT) ................................................ 749/00

(51) Int. Cl.[7] .............................. E02B 5/08; B01D 29/64
(52) U.S. Cl. ........................ 210/159; 210/162; 210/413; 210/541; 210/237
(58) Field of Search ................................ 210/159, 162, 210/413, 541, 237

(56) References Cited

U.S. PATENT DOCUMENTS

| 3,193,104 A | * | 7/1965 | Leach |
| 4,222,878 A | * | 9/1980 | Hansson |
| 5,571,406 A | * | 11/1996 | Mensching |
| 5,718,771 A | * | 2/1998 | Cassell et al. |
| 5,968,350 A | | 10/1999 | Davignon |

FOREIGN PATENT DOCUMENTS

| DE | 1 658 096 | 9/1970 |
| DE | 32 35 458 | 3/1984 |

* cited by examiner

*Primary Examiner*—Thomas M. Lithgow
(74) *Attorney, Agent, or Firm*—Reed Smith LLP

(57) ABSTRACT

A rake cleaning arrangement for a trashrack situated in front of the intake opening of a turbine arrangement, wherein the turbine arrangement is arranged in a weir opening delimited at its sides by two pillars and these pillars delimiting the weir opening are spanned by at least one gangway forming a service platform, comprises a bridge forming a service platform which can be lowered into the weir opening by a crane arranged on top of or on the gangway, and a skimming arrangement for removing flotsam from the trashrack by which a tool can travel along the vertical extent of the trashrack and which is arranged on the bridge, wherein the tool can travel along the vertical extent of the trashrack by the skimming arrangement when the bridge is stationary.

19 Claims, 5 Drawing Sheets

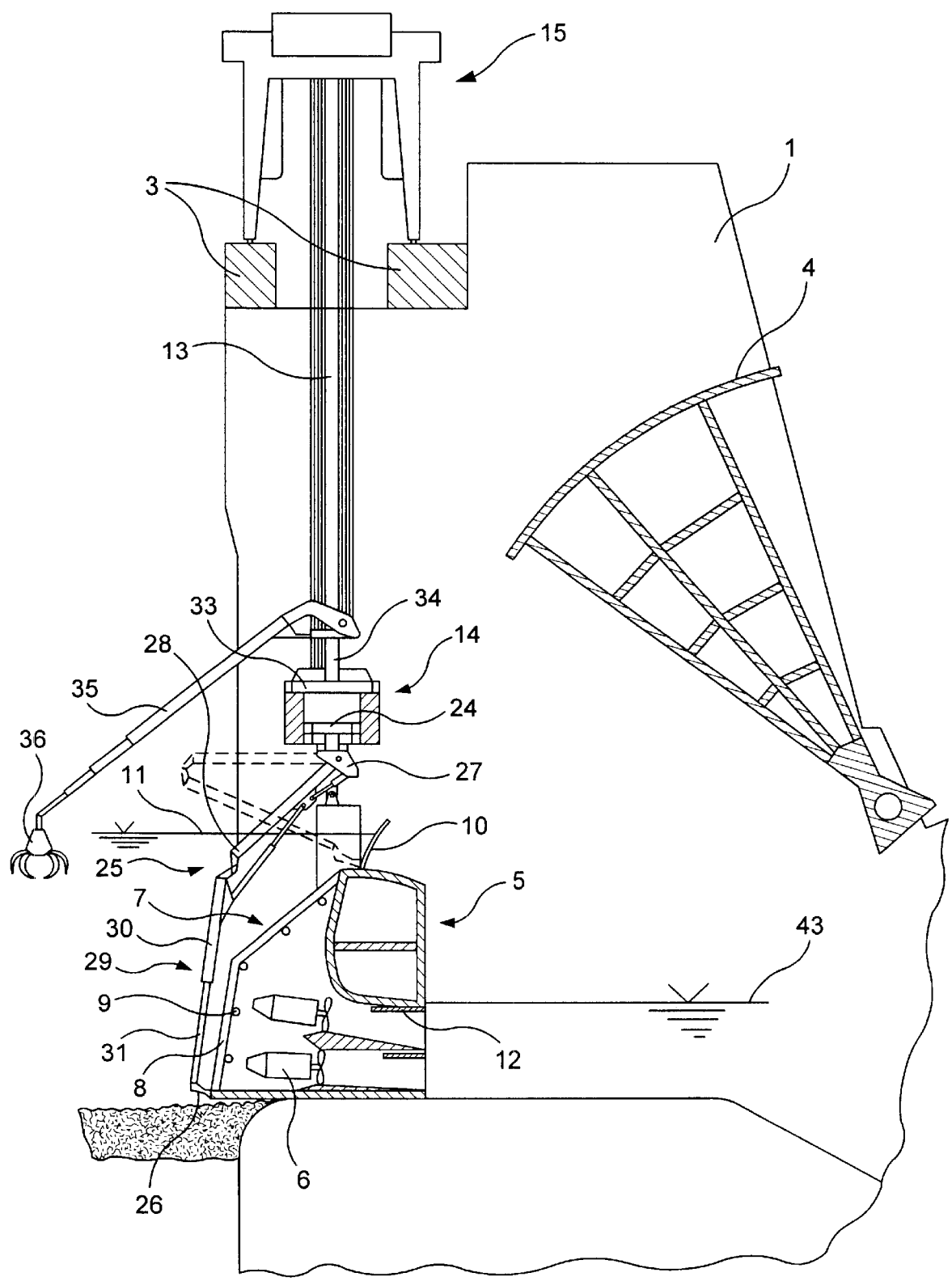
F I G. 2

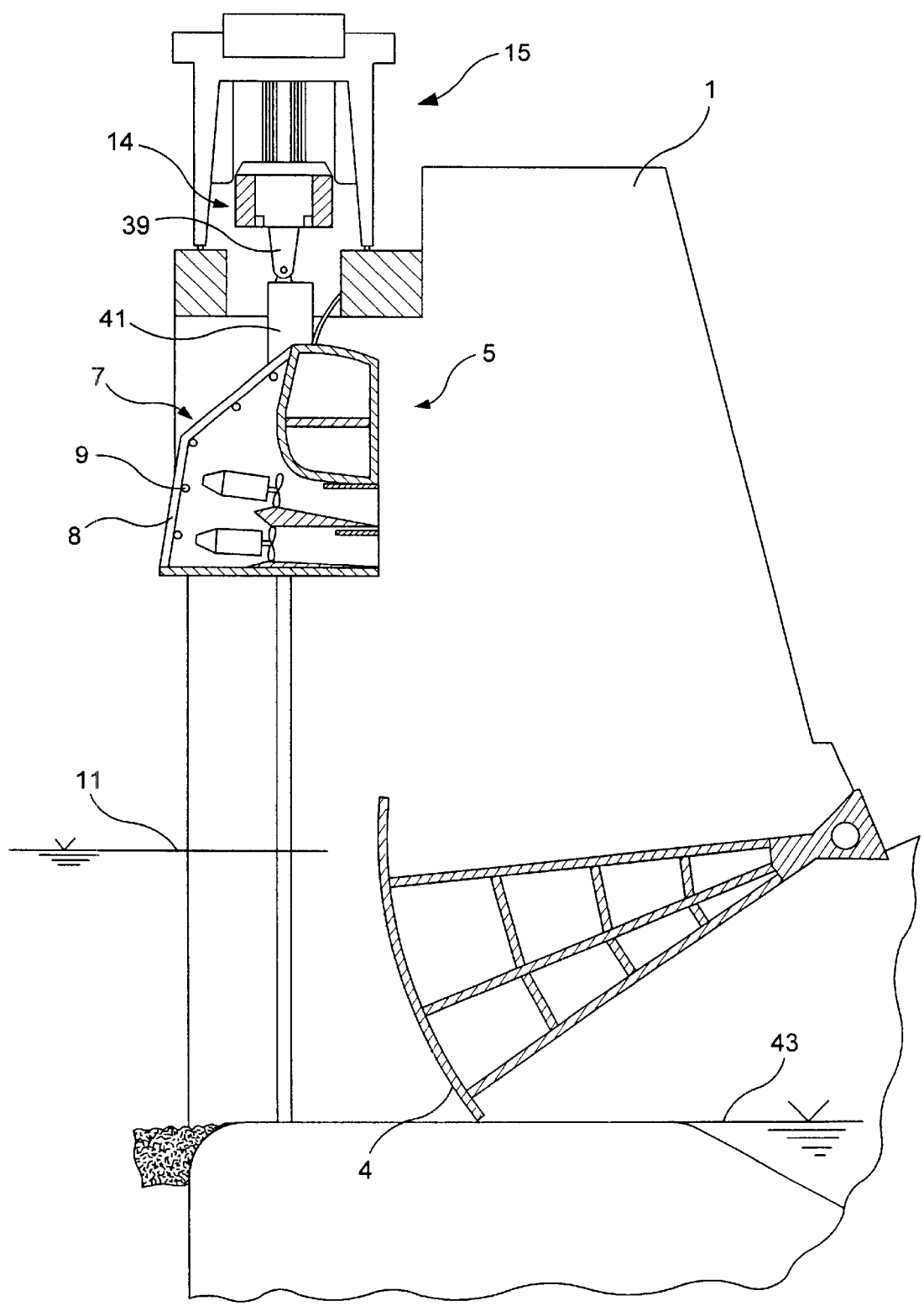
F I G. 4

RAKE CLEANING ARRANGEMENT

CROSS-REFERENCE TO RELATED APPLICATIONS

This application claims priority of Austrian Application A 749/2000, filed Apr. 28, 2000, the complete disclosure of which is hereby incorporated by reference.

BACKGROUND OF THE INVENTION a) Field of the Invention

The invention is directed to a rake cleaning arrangement for a trashrack situated in front of the intake opening of a turbine arrangement, wherein the turbine arrangement is arranged in a weir opening delimited at its sides by two pillars and these pillars delimiting the weir openings are spanned by at least one gangway forming a service platform.

The design of a river power station with a turbine arrangement which can be overflowed, is arranged in an opening between two pillars, and at the same time can fulfill the function of a weir, is known. These pillars are here spanned by a gangway forming a service platform on which a rake cleaning arrangement for cleaning the trashrack of the turbine arrangement is arranged.

b) Description of the Related Art

Rake cleaning arrangements for removing flotsam carried by the inflowing water and accumulated on the trashrack of water power stations are known in different embodiment forms. For example, a skimming arrangement of a rake cleaning arrangement is formed by a chassis frame on which a grab is arranged in a bearing which permits pivoting it on an axle arranged across the working direction of the cleaning apparatus and which can be lowered into the flotsam floating in the water and held back by the rack by means of a tackle line. Then, as soon as there is enough flotsam in front of the raised grab, the grab is operated by means of another tackle line and pivoted towards the chassis frame, by means of which the floating flotsam is gathered. The chassis frame which has been loaded thus is pulled up and emptied and then ready to be used again.

Rake cleaning arrangements can furthermore have a toothed bar the teeth of which extend between the individual bars of the grate when the toothed bar has been pivoted towards the grate. During the downward movement of the chassis frame, the toothed bar is lifted away from the grate and then, during the subsequent upward movement, pivoted towards the grate so that the flotsam is pulled upwards.

A rake cleaner is known from the German patent application DE 1 658 096 for which a cleaning carriage can travel along toothed racks arranged on both sides of the raceway by means of a gear motor and pinions driven by it. A cleaning rake is connected to the cleaning carriage via a cross beam of the cleaning carriage which carries this cleaning rake. By raising and lowering this cross beam forming part of the skimming arrangement, the cleaning rake can travel along the vertical extent of the trashrack.

Further rake cleaning arrangements are known from DE 32 35 458 A and U.S. Pat. No. 5,968,350 A. For the arrangement in DE 32 35 458 A, the skimming arrangement comprises a telescoping extension arm which is coupled to a base in such a way that it can be pivoted by a piston-cylinder-unit and on the free end of which a toothed bar is arranged as a tool. The traveling rake cleaner described in U.S. Pat. No. 5,968,350 A can be moved along rails, wherein a control station is also carried by the traveling carriage to which the extension arm with the tool is coupled.

It can be necessary to construct the pillars limiting the individual weir openings much higher than the water level corresponding to the maximum storage level of the top water. The gangway spanning the pillars here is therefore high above the ordinary level of the top water. This measure must be taken for rivers where the high water can be very high so that this can be let flow away. If a rake cleaning arrangement is here to be operated in a known manner, the skimming arrangement for removing the flotsam has to be lowered far below the service platform until it finally reaches the trashrack. This has disadvantages for the operation, since in particular the service staff is also very far away from the point of use.

OBJECT AND SUMMARY OF THE INVENTION

It is a primary object of the invention to provide a rake cleaning arrangement which overcomes these disadvantages and can be used advantageously even for service platforms situated high above the usual water level of the top water. According to the invention, this object is met by a rake cleaning arrangement which comprises:

a bridge forming a service platform which can be lowered into the weir opening by means of a crane arranged on top of or on the gangway, and a skimming arrangement for removing flotsam from the trashrack by means of which a tool can travel along the vertical extent of the trashrack and which is arranged on the bridge, wherein the tool can travel along the vertical extent of the trashrack by means of the skimming arrangement when the bridge is stationary.

It is therefore a basic idea of the invention to realize the rake cleaning arrangement with a height-adjustable service platform, arranged on which there is a skimming arrangement by means of which the tool, for example a toothed bar, can be raised or lowered along the vertical extent of the rack. On this service platform of the bridge forming the rake cleaning arrangement, a control station can be arranged for the operation of the skimming arrangement.

Preferably, the bridge extends essentially across the entire width of the weir opening and is guided by guiding grooves running vertically in the side faces of the pillars facing the bridge. Furthermore, the skimming arrangement is preferably capable of traveling along the lengthwise extent of the bridge. The tool attached to the skimming arrangement preferably realized in the shape of a toothed bar can therefore be narrower than the width of the trashrack, and cleaning the trashrack is done in a number of skimming processes.

Further advantages and details of the invention are subsequently to be described by means of a preferred embodiment example shown in the Figures from which further objects of the invention also emerge.

BRIEF DESCRIPTION OF THE DRAWINGS

In the drawings:

FIG. 2 shows a diagrammatic section along the line A—A in FIG. 1 with the bridge lowered;

FIG. 4 shows a diagrammatic section corresponding to FIG. 2 with the bridge and the turbine arrangement raised.

DESCRIPTION OF THE PREFERRED EMBODIMENTS

Figure 1:
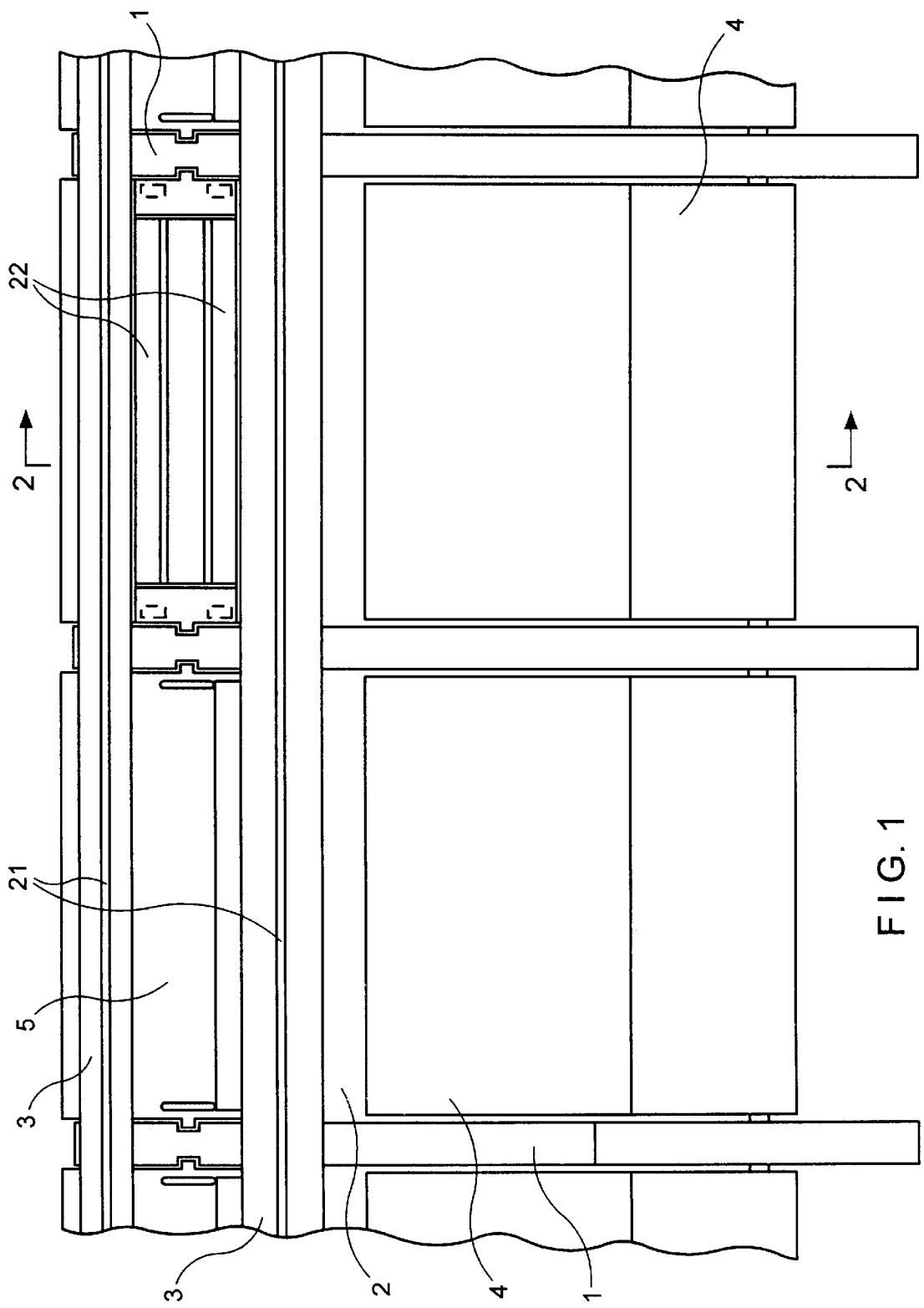
FIG. 1 shows a diagrammatic top view of a weir arrangement with turbine arrangements arranged between weir pillars and a bridge of a rake cleaning arrangement according to the invention, wherein the superstructures on the gangways spanning the pillars and on the bridge of the rake cleaning arrangement are not show n for reasons of clarity.
Figure 3:
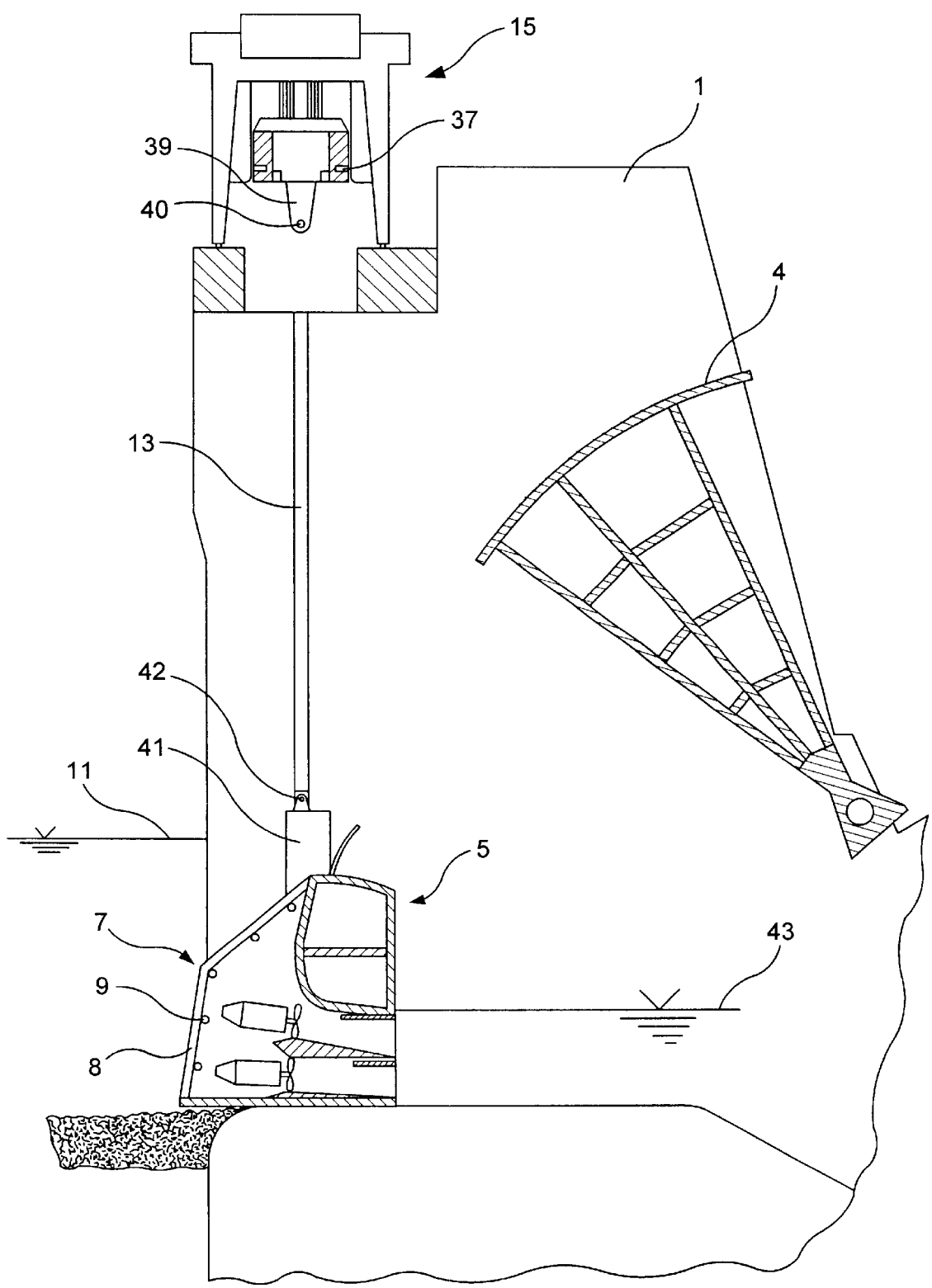
FIG. 3 shows a diagrammatic section corresponding to FIG. 2 with the bridge raised.

The weir shown diagrammatically in FIGS. 1 to 4 comprises pillars 1 which delimit weir openings 2 which openings all have the same width and which are spanned by two gangways 3 running parallel to each other at a distance. In the weir openings, weir gates 4 are provided in the shape of sector gates that can be raised and lowered. Furthermore, in one or more weir openings 2 and preferably in all weir openings, turbine arrangements 5 are arranged for the generation of energy. In each of the turbine arrangements 5, there is at least one turbine 6, or more. Preferably, there are a number of turbines 6 situated beside each other and in two tiers per turbine arrangement 5. In the inlet opening of the turbine arrangement 5, there is a trashrack 7 which essentially extends over the entire height of the turbine arrangement 5 and in this case is realized in a bent shape. The trashrack 7 is formed by a number of bars 8 running parallel and at a distance to each other from top to bottom which are linked by cross bars 9 situated on the inside. On the top side of the turbine arrangement 5, there is a pivotable weir wicket 10 for the regulation of the water level 11 of the top water. The water level 11 of the top water can furthermore be regulated by means of wickets 12 arranged behind the turbines 6 or in front of the outlet openings of the turbine arrangement 5 in such a way that they can be pivoted. If there is not enough water flow for the operation of all turbines, a corresponding number of wickets 12 is closed so that the desired storage level of the top water is achieved. The water level of the downstream water is referred to with the number 43.

Figure 5:
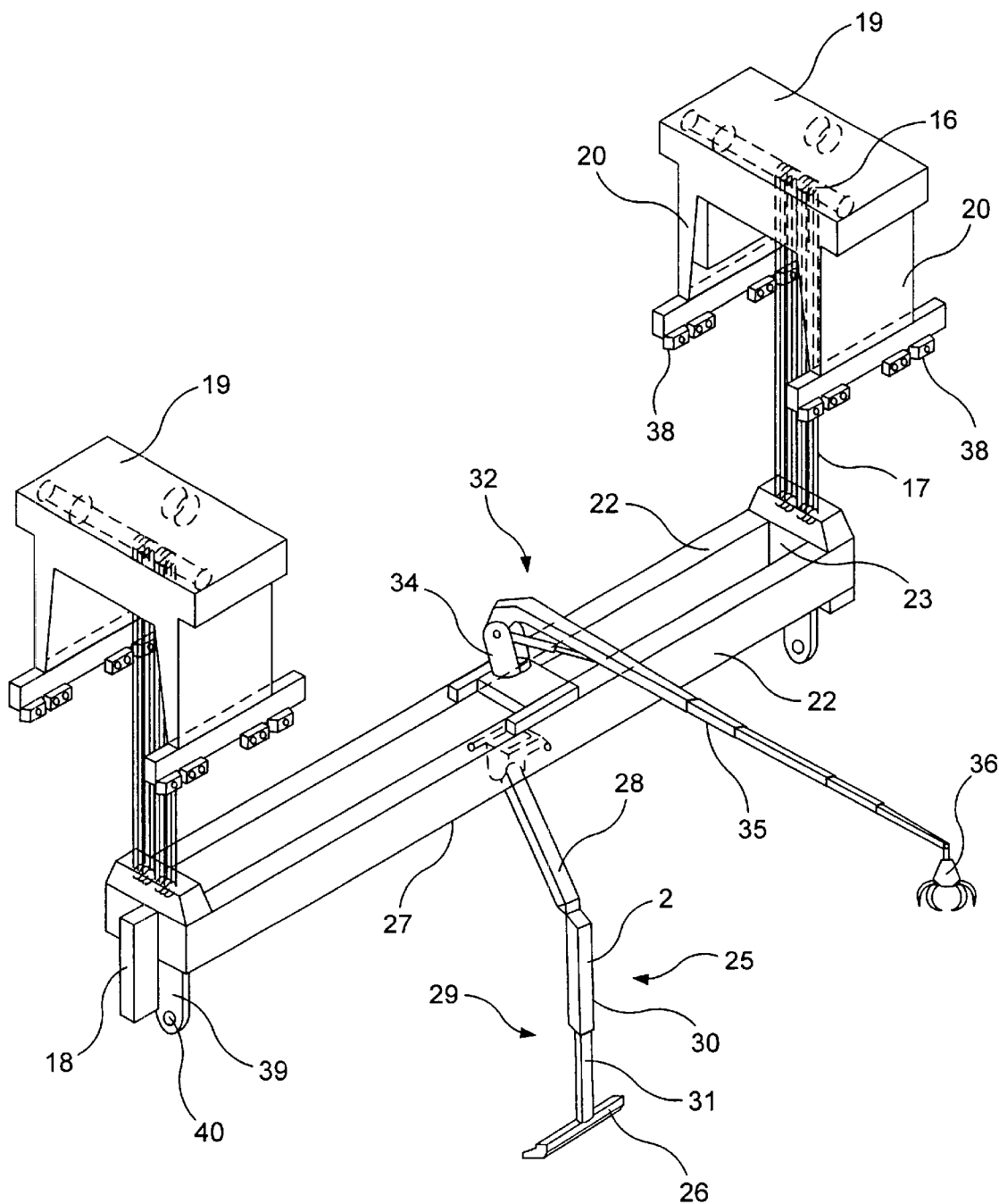
FIG. 5 shows a diagrammatic three-dimensional view of a rake cleaning arrangement according to the invention.

For the purpose of cleaning washed-up flotsam from the trashrack 7, a rake cleaning arrangement according to the invention is provided. This comprises a bridge 14 forming a service platform which can be raised and lowered by a crane 15 arranged on the gangways 3. For this purpose, the crane 15 has two sets of lifting gear 16 (only suggested in FIG. 5) the lifting media 17 of which are in the shape of wire cables (or chains) and engage in the areas of both ends of the bridge 14. The bridge 14 essentially extends across the entire width of a weir opening 2 and is guided in guiding grooves running vertically in the pillars 1 on their sides facing the bridge 14 by means of tenon blocks 18.

The crane 15 comprises two crane bridges 19 in each of which a lifting gear 16 is arranged and which are carried by two supports 20 essentially running vertically and each arranged above one of the gangways 3. The crane bridges 19 can travel on rails 21 along the lengthwise extent of the gangways 3.

The bridge 14 of the rake cleaning arrangement comprises two girders 22 running parallel and at a distance to each other and which are connected in their end areas by spacers 23. On the bottom side of the bridge 14, an extension arm 25 which can travel lengthwise along the bridge 14 is arranged on a bridge traveling mechanism 24 (cf. FIG. 2) and carries a tool 26 on its free end. This tool can for example be formed by a toothed bar the teeth of which protrude in between the bars 8 of the rack for a part of the diameter of the bars 8. Furthermore, a scraping bar without such teeth could be provided. In principle, it is also possible and conceivable that a tool 26 which is arranged in a pivoting bearing and which has a grab were to be used. The extension arm 25 is formed by a first arm 28 which can be pivoted on a base by a hydraulic cylinder unit. The second arm 29 comprises telescope arms 30, 31 wherein the telescope arm 31 can be retracted into and extended from the telescope arm 30.

For cleaning the trashrack 7, the tool 26 is guided from bottom to top over the bars 8 of the trashrack 7 by pivoting the arms 28, 29 or by telescoping the telescope arms 30, 31 (position of the extension arm 25 shown as a dashed line in FIG. 2), wherein flotsam washed up in front of the trashrack is guided upwards to the weir wicket 10. During this, the weir wicket is inclined a little bit, which results in a strong water current which carries the flotsam that has been pulled up with it. After this, the bridge traveling mechanism 24 of the extension arm 25 is moved along the bridge 14 for a suitable distance which approximately corresponds to the length of the tool and the next section of the trashrack is cleaned. This process of skimming the flotsam is repeated until the entire trashrack has been cleaned.

The lowered position of the bride in which the cleaning process of the trashrack takes place is shown in FIG. 2.

For grabbing and transporting away larger flotsam (for example by means of the current of the downstream water), a further extension arm 32 is provided. This arm can travel lengthwise along the bridge 14 by means of a bridge traveling mechanism arranged on top of the girders and is formed by a telescoping arm 35 which is pivotable on a base by means of a hydraulic cylinder unit and which has a grabbing tool 36 hanging from its free end.

Preferably, the bridge 14 is designed for being walked on, wherein railings not shown in the Figures are provided, and a control station for operating the skimming arrangement and the extension arm 32 are furthermore provided (for example on the bridge traveling mechanism 33 of the extension arm 35).

For relocating the bridge 14 to another of the weir openings 2 to clean the trashrack 7 of the turbine arrangement arranged in it, the bridge 14 can be lifted far enough that the blocks 18 leave the guide grooves 13 on the pillars 1 and the bottom edge of the bridge 14 is above the top edges of the pillars 1 in the area between the gangways 3. In the position of the bridge 14 shown in FIG. 3 where it is raised completely, it can be attached to the two crane bridges 19 by means of connecting devices, for example with pins 37 that can be inserted in boreholes on the side faces of the girders 22. The locking shoes 38 (cf. FIG. 5) on the traveling mechanism of the respective crane bridge 19 are released and the crane bridges 19 together with the bridge 14 of the rake cleaning arrangement attached to them travel along the gangways 3 until the position is reached where the bridge 14 can be lowered into the desired weir opening. For this, the tenon blocks 18 are inserted in the guiding grooves 13 in the pillars 1 again.

To lift the turbine arrangement 5 out of the water for maintenance purposes, a fixing link 39 with an eyelet 40 is provided on both end areas of the bottom side of the bridge 14. These fixing links 39 are essentially arranged vertically below the lifting media 17, so that when the turbine arrangement 5 is suspended, its weight does not need to be transferred via the girders 22. To suspend the turbine arrangement 5 from the fixing links 39, they have been provided with supporting links 41 which also have eyelets 42, wherein bolts are inserted in the eyelets 40, 42 for anchoring the turbine arrangement 5 in the fixing links.

In the raised position shown in FIG. 4, the turbine arrangements can be anchored to the pillars 1 by fastening means not shown here. The weir gate 4 is lowered when the raising of the turbine arrangement for maintenance is done during normal water flow. During high water flow of the river, one, more, or all of the turbine arrangements 5 can also be brought into the raised position and anchored there. In this case, the corresponding weir gates 4 remain open to let the high water flow out.

For reasons of clarity, the extension arms 25, 32 arranged on the bridge 14 are not shown.

Instead the of the shown telescoping pivotable extension arm 25 of the skimming arrangement of the rake cleaning arrangement, another arrangement for guiding the tool across the trashrack 7 could be provided. Depending on the shape of the trashrack, an extension arm that only telescopes but is not pivotable or a multi-armed, pivotable and non-telescoping extension arm could be provided. In principle, guiding the tool over the trashrack 7 with tackle lines is also conceivable and possible.

While the foregoing description and drawings represent the present invention, it will be obvious to those skilled in the art that various changes may be made therein without departing from the true spirit and scope of the present invention.

What is claimed is:

1. A rake cleaning arrangement for a trashrack situated in front of the intake opening of a turbine arrangement, wherein the turbine arrangement is arranged in a weir opening delimited at its sides by two pillars and these pillars delimiting the weir opening are spanned by at least one gangway forming a service platform; the rake cleaning arrangement comprising:
    a bridge forming a service platform which can be lowered into the weir opening by a crane arranged on top of or on the gangway; and
    a skimming arrangement for removing flotsam from the trashrack by which a tool can travel along the vertical extent of the trashrack and which is arranged on the bridge, wherein the tool can travel along the vertical extent of the trashrack by the skimming arrangement when the bridge is stationary.

2. The rake cleaning arrangement according to claim 1, wherein the bridge essentially extends across the entire width of the weir opening.

3. The rake cleaning arrangement according to claim 2, wherein guiding grooves are provided in the side faces of the pillars facing the bridge in which the bridge is guided by tenon blocks.

4. The rake cleaning arrangement according to claim 1, wherein the gangway spans at least two weir openings delimited by pillars in between which turbine arrangements with trashracks in front of their inlet openings are provided and wherein the bridge can be lifted by the crane to above the top edges of the pillars and the crane can travel together with the bridge along the gangway so that the bridge can be lowered into any of the weir openings.

5. The rake cleaning arrangement according to claim 1, wherein two gangways arranged parallel and at a distance to each other span the pillars and the crane comprises at least one crane bridge supported by both gangways.

6. The rake cleaning arrangement according to claim 1, wherein the crane comprises two sets of lifting gear, the lifting media of which engage in the two end areas of the bridge.

7. The rake cleaning arrangement according to claim 6, wherein fixing links for suspending a turbine arrangement are arranged on the bottom side of the bridge in the two end areas of the bridge and essentially vertically below a lifting medium.

8. The rake cleaning arrangement according to claim 5, wherein the crane comprises two crane bridges which are carried by two essentially vertical supports each arranged above one of the gangways.

9. The rake cleaning arrangement according to claim 8, wherein the bridge can be attached to the two crane bridges when it has been raised completely and the crane bridges can travel along the gangways in this state of being attached to he bridge.

10. The rake cleaning arrangement according to claim 1, wherein the skimming arrangement can travel along the lengthwise extent of the bridge.

11. The rake cleaning arrangement according to claim 1, wherein the skimming arrangement comprises an extension arm on the free end of which a tool is arranged.

12. The rake cleaning arrangement according to claim 11, wherein the tool is a toothed bar, a scraping bar or the like.

13. The rake cleaning arrangement according to claim 11, wherein the extension arm can be telescoped.

14. The rake cleaning arrangement according to claim 11, wherein the extension arm has a first arm that can be pivoted on a base by a piston-cylinder unit, wherein on the free end of the first arm a second arm which can be pivoted by a piston-cylinder unit is arranged in a bearing and the tool is arranged on the free end of the second arm.

15. The rake cleaning arrangement according to claim 14, wherein the second arm of the extension arm can be telescoped.

16. The rake cleaning arrangement according to claim 1, wherein a control station for the operation of the skimming arrangement is arranged on the bridge.

17. The rake cleaning arrangement according to claim 1, wherein the bridge has two girders running parallel and at a distance to each other.

18. The rake cleaning arrangement according to claim 1, wherein an extension arm, which can be pivoted by a piston-cylinder unit and which carries a grabbing tool on its free end, is arranged on the bridge and is capable of traveling along this bridge.

19. The rake cleaning arrangement according to claim 1, wherein the tool is a toothed bar.

* * * * *